May 12, 1931.  T. E. CLINE ET AL  1,804,552
FOOT GUIDING MECHANISM
Filed Feb. 28, 1930   2 Sheets-Sheet 1

Inventors
THADDEUS E. CLINE
RAY E. TIPTON

Attorney

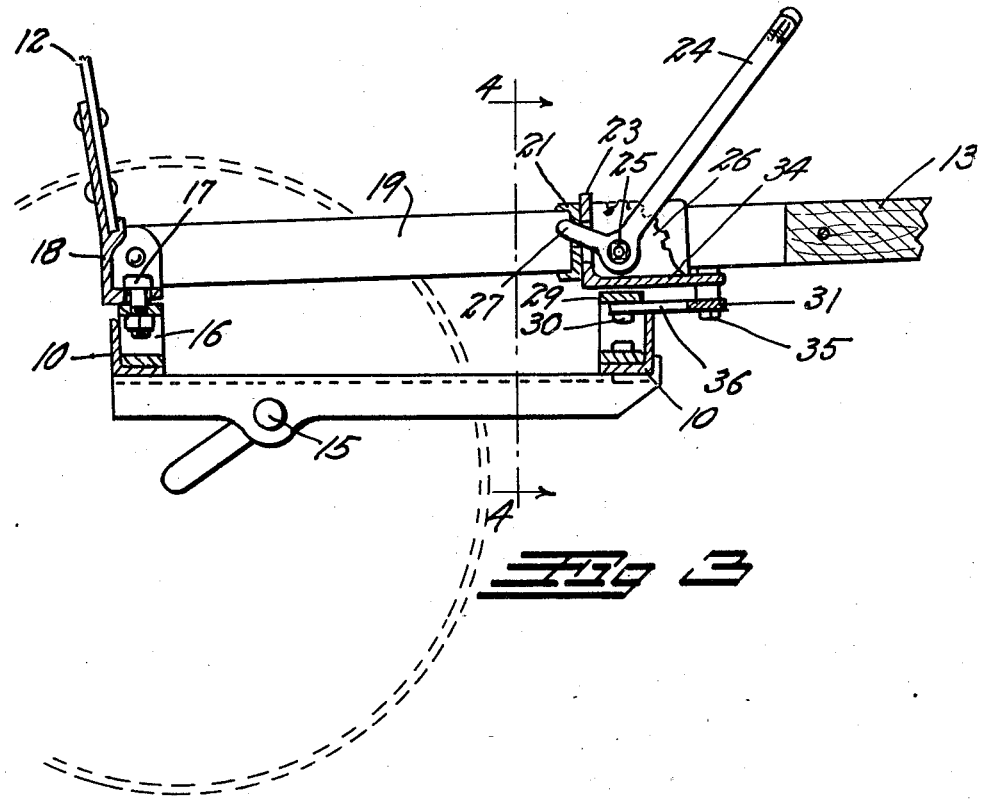
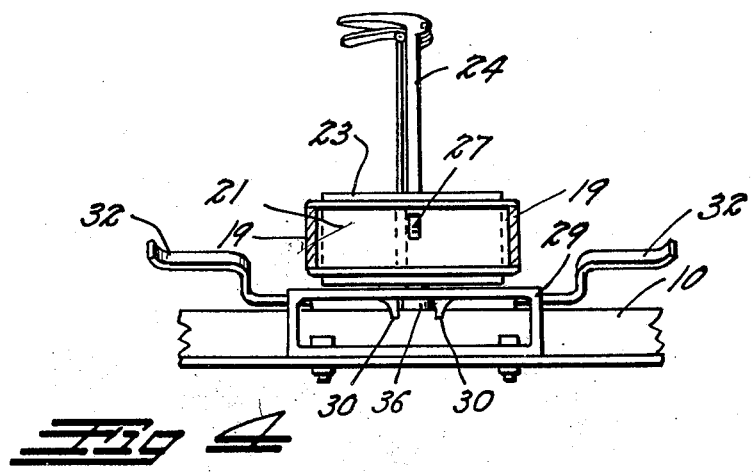

Patented May 12, 1931

1,804,552

UNITED STATES PATENT OFFICE

THADDEUS E. CLINE AND RAY E. TIPTON, OF DENVER, COLORADO

FOOT GUIDING MECHANISM

Application filed February 28, 1930. Serial No. 432,019.

This invention relates to a guiding mechanism for farm implements and has for its principal object the provision of means which will enable the operator of a farm implement such as a bean harvester, cultivator, or similar device, to be more efficiently and accurately guided than with the present mechanisms.

Another object of the invention is to provide a simple and effective vertical angle adjustment for leveling and adjusting the frame of the implement.

A further object of the invention is to so construct the mechanism that the implement will be guided by swinging the entire frame and wheels about a single rearwardly placed pivot.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

Only sufficient parts of a typical farm implement have been shown in the drawing to illustrate the application of the present invention.

In the drawing:—

Fig. 3 is an enlarged vertical section taken on the line 3—3, Fig. 2.

Fig. 4 is a detail section taken on the line 4—4, Fig. 3.

Figure 1:
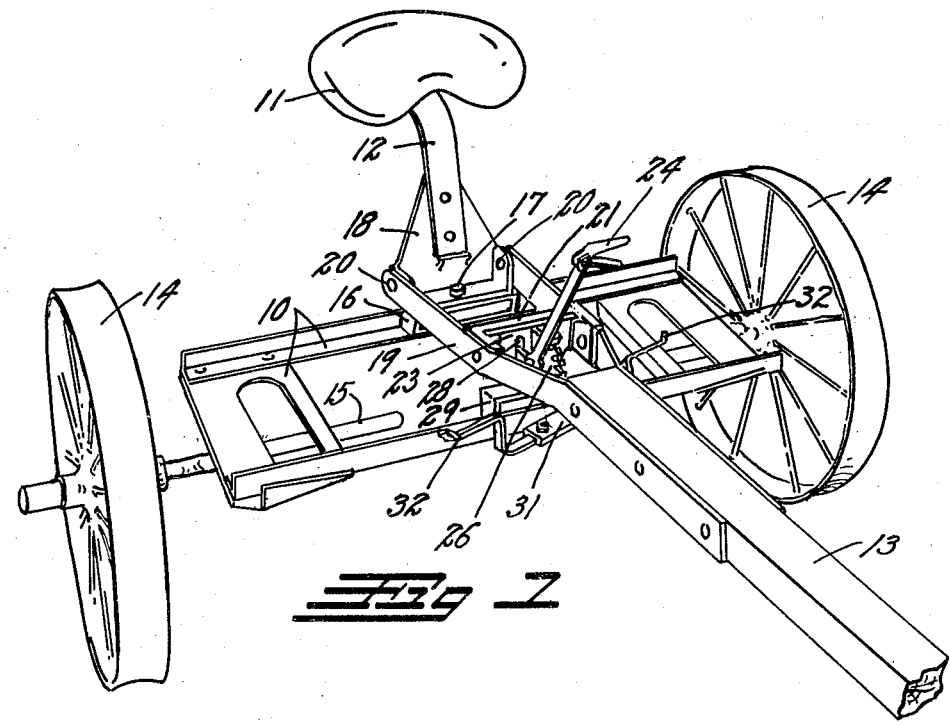
Fig. 1 is a perspective view of the frame, wheels, and tongue of a typical farm implement, illustrating the invention in place thereon.
Figure 2:
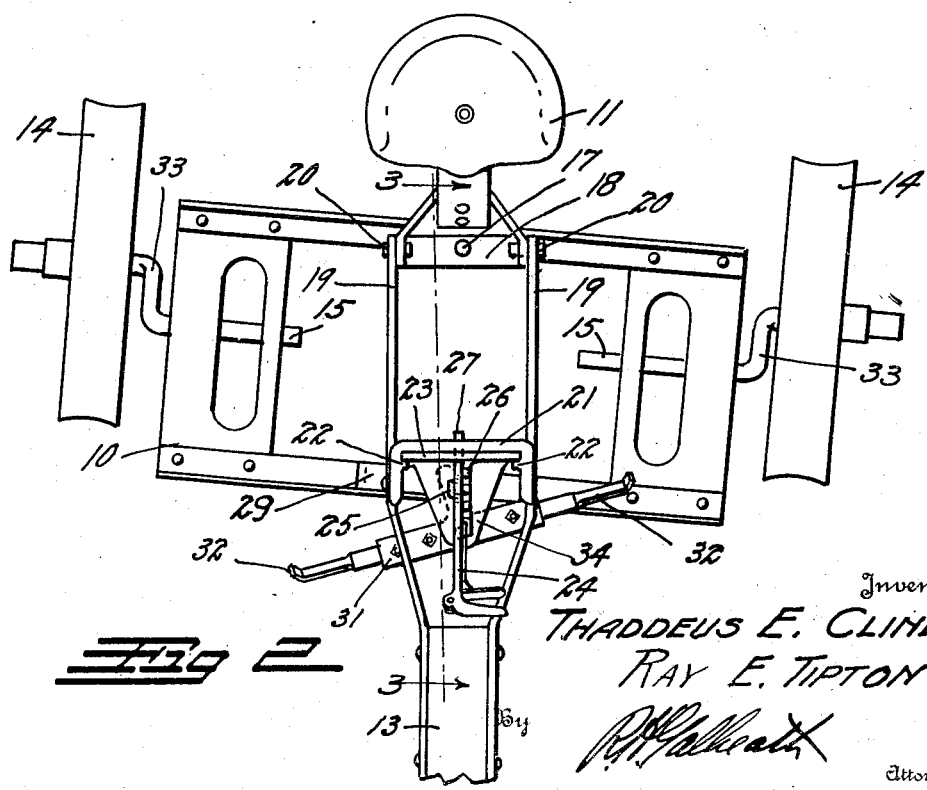
Fig. 2 is a plan view thereof.

The various parts of a typical farm implement are indicated by numeral as follows: frame 10; operator's seat 11; seat post 12; tongue 13; wheels 14; and axles 15.

In applying the invention, a pivot block 16 is secured to the rear member of the frame 10 and provided with a suitable pivot pin or bolt 17. A combined seat support and tongue member 18 is pivoted upon the pivot pin 17 and supports the seat post 12. The tongue 13 is carried between two flat side bars 19 which are secured at 20 to the sides of the tongue member 18. The opening in the tongue member 18 for the reception of the pivot 17 is sufficiently large to allow the member to rock upon the pivot block 16 a limited distance. This provides a universal joint at this point which allows the entire frame 10 with the wheels 14 to be swung both vertically and horizontally about the pivot 17.

A brace member 21 extends between the side bars 19. The brace member 21 is provided with vertical guides 22, which retain a vertically adjustable bracket member 23 in place, and with a forwardly extending apron 34 carrying a toothed sector 26. The bracket member 23 may be raised or lowered in the brace member 21 by means of a hand lever 24, which is pivoted at 25 to the sector 26. The lower extremity 27 of the lever 24 extends rearwardly through a slotted opening 28 in the bracket member 23 and through a second smaller opening in the brace member 21. As the lever 24 is rotated about its pivot the extremity 27 thereof will press downwardly or upwardly in its opening in the brace member 21 to raise or lower the bracket member 23. Thus the frame 10 can be leveled by raising or lowering its forward extremity.

A guide block 29 provided with two downwardly projecting bosses 30 is secured to the forward member of the frame 10. A T-shaped lever 31 is pivoted at 35 to the forwardly projecting apron 34 of the bracket member 23. The stem of the T-shaped lever 31 extends rearwardly between the bosses 30 of the guide block 29. Foot rests 32 are secured to and project from each lateral extremity of the T-shaped lever 31.

In use, the operator rides with his feet upon the foot rests 32. Should he desire to cause the implement to guide to the right, he forces his right foot forwardly causing the lever 31 to act through the bosses 30 and the guide block 29 to swing the entire frame 10 to the right, about the pivot pin 17. Should he desire to guide to the left, the reverse operation is carried out by forcing his left foot forwardly. Should he desire to raise the forward extremity of the frame 10 to level the implement he draws the hand lever 24 toward him causing the lever extremity 27 to pry against the cross member 21 and lift the forward extremity of the frame 10. Should the implement be of a character in which the entire frame is desired to be raised or lowered the axles 15 may be bent as shown at 33 to provide the desired vertical adjustment. The latter, however, forms no part of the present invention.

While a specific form of the improvement has been described and illustrated herein, it is desired to be understood that the same may be varied, within the scope of the appended claims without departing from the spirit of the invention.

Having thus described the invention, what is claimed and desired secured by Letters Patent is:—

1. A guide mechanism for farm implements of the type having a frame and a tongue, comprising: a tongue member pivoted to said frame adjacent its rear; tongue supporting members secured to said tongue member at their one extremity and to said tongue at their other extremity; a bracket member supported intermediate said tongue supporting members; a T-shaped lever pivoted to said bracket member; a stem on said lever arranged to engage projections supported from said frame so as to swing the latter about its pivot; and foot rests extending from the extremities of said T-shaped lever.

2. A guide mechanism for farm implements of the type having a frame and a tongue, comprising: a tongue member pivoted to said frame adjacent its rear; tongue supporting members secured to said tongue member at their one extremity and to said tongue at their other extremity; a bracket member supported intermediate said tongue supporting members; a T-shaped lever pivoted to said bracket member; a stem on said lever arranged to engage projections supported from said frame so as to swing the latter about its pivot; foot rests extending from the extremities of said T-shaped lever; and means for raising and lowering said bracket member.

3. A guide mechanism for farm implements of the type having a frame and a tongue, comprising: a tongue member pivoted to said frame adjacent its rear; tongue supporting members secured to said tongue member at their one extremity and to said tongue at their other extremity; a bracket member supported intermediate said tongue supporting members; a T-shaped lever pivoted to said bracket member; a stem on said lever arranged to engage projections supported from said frame so as to swing the latter about its pivot; foot rests extending from the extremities of said T-shaped lever; guides in said brace member arranged to slidably engage said bracket member; and a lever carried by said bracket member and arranged to engage said brace member so as to raise and lower said bracket member.

4. A guide mechanism for farm implements of the type having a frame and a tongue, comprising: a tongue member pivoted to said frame adjacent its rear; tongue supporting members secured to said tongue member at their one extremity and to said tongue at their other extremity; a brace member separating said tongue supporting members; a pivot supported from said brace member; a T-shaped lever mounted on said pivot; foot rests carried on the lateral extremities of said T-shaped lever; and means supported from said frame for engagement by said T-shaped lever so as to swing said frame about its pivot.

In testimony whereof, we affix our signatures.

THADDEUS E. CLINE.
RAY E. TIPTON.